(12) United States Patent
DeMartine et al.

(10) Patent No.: US 10,239,544 B1
(45) Date of Patent: Mar. 26, 2019

(54) GUIDED DELIVERY VEHICLE

(71) Applicants: Daniel R. DeMartine, Toano, VA (US); John J. Douglas, Williamsburg, VA (US)

(72) Inventors: Daniel R. DeMartine, Toano, VA (US); John J. Douglas, Williamsburg, VA (US)

(73) Assignee: 888 Brands LLC, Williamsburg, VA (US)

( * ) Notice: Subject to any disclaimer, the term of this patent is extended or adjusted under 35 U.S.C. 154(b) by 175 days.

(21) Appl. No.: 15/262,296

(22) Filed: Sep. 12, 2016

Related U.S. Application Data

(60) Provisional application No. 62/216,422, filed on Sep. 10, 2015.

(51) Int. Cl.
| | |
|---|---|
| *G05D 1/02* | (2006.01) |
| *B61B 13/00* | (2006.01) |
| *B61L 27/00* | (2006.01) |
| *G05D 1/00* | (2006.01) |
| *B60L 11/18* | (2006.01) |
| *B61C 3/00* | (2006.01) |
| *B61L 25/02* | (2006.01) |

(52) U.S. Cl.
CPC ....... *B61L 27/0005* (2013.01); *B60L 11/1816* (2013.01); *B61B 13/00* (2013.01); *B61C 3/00* (2013.01); *B61L 25/02* (2013.01); *B61L 27/0077* (2013.01); *G05D 1/0011* (2013.01); *G05D 1/0088* (2013.01); *B61L 2201/00* (2013.01); *B61L 2205/00* (2013.01)

(58) Field of Classification Search
CPC .. G05D 1/0011; G05D 1/0088; G05D 1/0229; G05D 1/0259–1/0265; G05D 1/0297; G05D 1/0231–1/0244; G05D 2201/0213; G05D 2201/0216; G05D 2201/0211; G06Q 10/08–10/0875; G06Q 50/28; B61L 27/0005; B61L 27/0077; B61L 25/02; B61B 13/00; B60L 11/1816; B61C 3/00

See application file for complete search history.

(56) References Cited

U.S. PATENT DOCUMENTS

| | | | |
|---|---|---|---|
| 5,111,401 A | * | 5/1992 | Everett, Jr. et al. ........................ G05D 1/0242 364/424.02 |
| 2015/0006005 A1 | * | 1/2015 | Yu et al. .................. G08G 1/16 |

* cited by examiner

*Primary Examiner* — Adam R Mott
(74) *Attorney, Agent, or Firm* — Shaddock Law Group, PC (57) ABSTRACT

A guided delivery vehicle having one or more item support regions atop a carrier body; one or more drive wheels attached or coupled to one or more powered servo motors; a receiver for receiving one or more transmitted signals; at least one junction detection sensor, wherein the at least one junction detection sensor is capable of detecting a junction identifier associated with a determined position along a guide track; and a controller that receives and processes input from at least the receiver and the at least one junction detection sensor, and, in response to a received and processed input, executes an initial command step and sequentially executes subsequent command steps upon detection of a subsequent junction identifier.

20 Claims, 8 Drawing Sheets

| Table 1 Command | Table 2 Command | Table 3 Command | Table 4 Command |
|---|---|---|---|
| ChargerUndock | ChargerUndock | ChargerUndock | ChargerUndock |
| Forward | Forward | Forward | Forward |
| TurnLeft | TurnLeft | TurnLeft | TurnLeft |
| Forward | Forward | Forward | Forward |
| Forward | Forward | Forward | WaitButtonRight |
| Forward | Forward | WaitButtonRight | Reverse |
| TurnRight | TurnRight | Reverse | ReverseLeft |
| Forward | Forward | Reverse | Reverse |
| WaitButtonRight | WaitButtonRight | ReverseLeft | ChargerDock |
| Reverse | Reverse | Reverse | |
| ReverseRight | ReverseRight | ChargerDock | |
| Reverse | Reverse | | |
| Reverse | Reverse | | |
| Reverse | Reverse | | |
| ReverseLeft | ReverseLeft | | |
| Reverse | Reverse | | |
| ChargerDock | ChargerDock | | |

FIG. 8B

| | |
|---|---|
| CU | Charger Undock |
| CD | Charger Dock |
| F1 | Forward At Speed Level 1 |
| F2 | Forward At Speed Level 2 |
| F3 | Forward At Speed Level 3 |
| F4 | Forward At Speed Level 4 |
| FL | Forward Left Turn At Turn Speed |
| FR | Forward Right Turn At Turn Speed |
| Fl | Forward S Left Turn At Turn Speed |
| Fr | Forward S Right Turn At Turn Speed |
| R1 | Reverse At Speed Level 1 |
| R2 | Reverse At Speed Level 2 |
| R3 | Reverse At Speed Level 3 |
| R4 | Reverse At Speed Level 4 |
| RL | Reverse Left Turn At Turn Speed |
| RR | Reverse Right Turn At Turn Speed |
| Rl | Reverse S Left Turn At Turn Speed |
| Rr | Reverse S Right Turn At Turn Speed |
| WT | Station Stop With Both Button Operation |
| WL | Station Stop With Left Button Operation |
| WR | Station Stop With Right Button Operation |

GUIDED DELIVERY VEHICLE

CROSS-REFERENCE TO RELATED APPLICATIONS

This patent application claims the benefit of U.S. Patent Application Ser. No. 62/216,422, filed Sep. 10, 2015, the entire disclosure of which is incorporated herein by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE DISCLOSURE

1. Field of the Disclosure

The present disclosure relates generally to the field of guided delivery vehicles. More specifically, the presently disclosed systems, methods, and/or apparatuses relate to a guided delivery vehicle and guided delivery vehicle system adaptable to be used to deliver items to a determined destination.

2. Description of Related Art

It is generally known to utilize certain types of carriers in industrial applications, such as, for example, material handling around a factory. These carriers have been used to transport loads from one point to another and to carry or transfer loads that a normal person would be unable to lift or carry. These carriers can be controlled via remote control and can be programmed to perform certain transportation tasks automatically. However, these carriers are large and bulky and would not be suitable outside of a warehouse or industrial setting.

Another type of known delivery carrier travels on a track, akin to a railroad track, to deliver items to an end user. These track delivery systems can be used, for example, to replace human servers for delivering food or other items to customers, especially during peak periods, when restaurants are full of customers and there may not be enough servers to serve food or deliver items to each of the customers. These systems are able to deliver an order to a customer, while traveling on a track to the customers table, where the customer will be able to take his/her order from the delivery carrier itself. However, these track delivery carriers are limited as they can only run along a pre-established, physical track and cannot turn or rotate, meaning that these delivery carriers have no navigation capabilities and very limited delivery capabilities.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE DISCLOSURE

Thus, the known carrier devices and systems have a number of shortcomings. In various exemplary, non-limiting embodiments, the guided delivery vehicle of the presently disclosed systems, methods, and/or apparatuses provides a more interactive guided delivery vehicle that operates utilizing software systems, such as, for example, an Android or iOS operating system, via a user interface. This provides a simple and fast interface to set up and use the guided delivery vehicle of the present disclosure.

In various exemplary, non-limiting embodiments, the guided delivery vehicle of the presently disclosed systems, methods, and/or apparatuses comprises a compact, guided delivery vehicle body. The carrier body acts as a housing for the electrical components, one or more load detection sensors, one or more obstacle detection sensors, one or more junction detection sensors one or more power storage elements, one or more servo motors, mechanical and automation components to navigate, at least one signal receiving element, being housed inside the guided delivery vehicle body.

In various exemplary, non-limiting embodiments, received signals operate, control, and monitor the guided delivery vehicle body. In various exemplary, non-limiting embodiments, an Android or iOS mobile device or computer establish connection to the guided delivery vehicle via Wi-Fi, then communicates with the guided delivery vehicle wirelessly via Transmission Control Protocol/Internet Protocol (TCP/IP) connection. A guide track that the guided delivery vehicle body runs along, containing junction identifiers optionally made of magnetic strips underneath its path, a compact guided delivery vehicle body able to turn and move in any track directions along the guide track, a compact guided delivery vehicle body wherein the guided delivery vehicle body has item support regions on top of the guided delivery vehicle body, a compact guided delivery vehicle body capable of adjusting motion to maneuver along the guide track automatically.

This guided delivery vehicle system can replace waiters and waitresses and deliver food to customers in a speedy and efficient manner. Furthermore, seeing the guided delivery vehicle in motion with its optional flashing lights and optional ability to interact with customers can help to attract customers to dine in the restaurant. The guided delivery vehicle also allows customers to see food or other items being delivered to other customers, which can further entice customers to purchase additional items.

The present disclosure provides a guided delivery vehicle and system made to replace human beings for the delivery process and its compact design is more suitable for restaurant application. The guided delivery vehicle is operated with a mobile device or computer, which renders it easy to use and program. The guided delivery vehicle system is able to communicate with one or more tablets or computers, move along a guide track, and execute commands based on detection of one or more junction identifiers that will allow the guided delivery vehicle to determine a motion command. The guided delivery vehicle will move towards the table where a customer is waiting for an order, along a guide track, where the guided delivery vehicle can move in virtually any direction, be it angle bends or curve bends. The guided delivery vehicle is also capable of rotating and reversing, giving the guided delivery vehicle a number of advantages in both navigation and movement.

In various exemplary, nonlimiting embodiments, the guided delivery vehicle includes one or more item support regions atop a carrier body; one or more drive wheels attached or coupled to one or more powered servo motors; a receiver for receiving one or more transmitted signals; at least one junction detection sensor, wherein the at least one junction detection sensor is capable of detecting a junction identifier associated with a determined position along a guide track; and a controller, wherein the controller receives and processes input from at least the receiver and the at least one junction detection sensor, and wherein the controller, in response to a received and processed input, executes an initial command step and sequentially executes subsequent command steps upon detection of a subsequent junction identifier.

In certain exemplary embodiments, the guided delivery vehicle also optionally includes a mobile device or computer that establishes a wireless connection to the guided delivery vehicle to transmit the one or more transmitted signals to the receiver of the guided delivery vehicle.

In certain exemplary embodiments, the guided delivery vehicle is able to turn and move in any direction along the guide track.

In certain exemplary embodiments, the guided delivery vehicle is capable of adjusting motion to maneuver along the guide track.

In certain exemplary embodiments, the guided delivery vehicle also optionally includes one or more selectable elements, wherein the one or more selectable elements provide additional input to the controller and allow the guided delivery vehicle to receive commands or input from a user.

In certain exemplary embodiments, each junction identifier comprises at least one of a magnetic strip or an optically identifiable indicia or element.

In certain exemplary embodiments, the one or more transmitted signals include the command steps to execute the task.

In certain exemplary embodiments, the controller contains one or more tables of command steps, and wherein the input identifies a discreet table of command steps from the one or more tables of command steps.

In various exemplary, nonlimiting embodiments, the disclosed method for operating the guided delivery vehicle includes receiving, via the receiver, a transmitted signal; providing an input to the controller in response to receiving the transmitted signal; processing, via the controller, the input to determine one or more command steps to execute the task; performing a first command step until a junction identifier is detected by the at least one junction detection sensor; and performing a subsequent command step until a subsequent junction identifier is detected by the at least one junction detection sensor.

In certain exemplary embodiments, the step of performing a subsequent command step until a subsequent junction identifier is detected by the at least one junction detection sensor comprises performing a subsequent command step at each of the subsequent junction identifiers along the guide track.

In certain exemplary embodiments, at least certain of the command steps include actuation of the one or more powered servo motors to rotate the one or more drive wheels to cause the guided delivery vehicle to move in a desired direction.

In various exemplary, nonlimiting embodiments, the disclosed method for operating the guided delivery vehicle includes receiving, via the receiver, a transmitted signal, wherein the transmitted signal identifies a location proximate a customer for delivery of the item; providing an input to the controller in response to receiving the transmitted signal; processing, via the controller, the input to determine one or more command steps to retrieve the item and deliver the item to the location proximate the customer; controlling the guided delivery vehicle to travel along a portion of the guide track until a junction identifier is detected by the at least one junction detection sensor; determining whether the junction identifier identifies a location proximate the location of the customer; and continuing to perform, if the junction identifier does not identify a present location as the location proximate the location of the customer, a subsequent command step until a subsequent junction identifier is detected by the at least one junction detection sensor, and if the junction identifier identifies a present location as the location proximate the location of the consumer, allowing the consumer to remove the item from the guided delivery vehicle.

Accordingly, the presently disclosed systems, methods, and/or apparatuses provide a guided delivery vehicle that allows one or more items to be automatically or autonomously delivered to a determined location.

The presently disclosed systems, methods, and/or apparatuses separately provide a guided delivery vehicle that can automatically return to a charging station.

The presently disclosed systems, methods, and/or apparatuses separately provide a guided delivery vehicle that is capable of delivering one or more items to one or more identified locations.

The presently disclosed systems, methods, and/or apparatuses separately provide a guided delivery vehicle that can be easily programmed and operated by a user.

The presently disclosed systems, methods, and/or apparatuses separately provide a guided delivery vehicle that is able to integrate with operating systems which are known to be easy to program.

The presently disclosed systems, methods, and/or apparatuses separately provide a guided delivery vehicle that is able to move in a multitude of directions.

The presently disclosed systems, methods, and/or apparatuses separately provide a guided delivery vehicle that may optionally be interactive with staff and customers.

These and other aspects, features, and advantages of the presently disclosed systems, methods, and/or apparatuses are described in or are apparent from the following detailed description of the exemplary, non-limiting embodiments of the presently disclosed systems, methods, and/or apparatuses and the accompanying figures. Other aspects and features of embodiments of the presently disclosed systems, methods, and/or apparatuses will become apparent to those of ordinary skill in the art upon reviewing the following description of specific, exemplary embodiments of the presently disclosed systems, methods, and/or apparatuses in concert with the figures. While features of the presently disclosed systems, methods, and/or apparatuses may be discussed relative to certain embodiments and figures, all embodiments of the presently disclosed systems, methods, and/or apparatuses can include one or more of the features discussed herein. Further, while one or more embodiments may be discussed as having certain advantageous features, one or more of such features may also be used with the various embodiments of the systems, methods, and/or apparatuses discussed herein. In similar fashion, while exemplary embodiments may be discussed below as device, system, or method embodiments, it is to be understood that such exemplary embodiments can be implemented in various devices, systems, and methods of the presently disclosed systems, methods, and/or apparatuses.

Any benefits, advantages, or solutions to problems that are described herein with regard to specific embodiments are not intended to be construed as a critical, required, or essential feature(s) or element(s) of the presently disclosed systems, methods, and/or apparatuses or the claims.

BRIEF DESCRIPTION OF THE SEVERAL VIEWS OF THE DRAWINGS

As required, detailed exemplary embodiments of the presently disclosed systems, methods, and/or apparatuses are disclosed herein; however, it is to be understood that the disclosed embodiments are merely exemplary of the presently disclosed systems, methods, and/or apparatuses that may be embodied in various and alternative forms, within the scope of the presently disclosed systems, methods, and/or apparatuses. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the presently disclosed systems, methods, and/or apparatuses.

The exemplary embodiments of the presently disclosed systems, methods, and/or apparatuses will be described in detail, with reference to the following figures, wherein like reference numerals refer to like parts throughout the several views, and wherein.

DETAILED DESCRIPTION OF EXEMPLARY EMBODIMENTS OF THE DISCLOSURE

For simplicity and clarification, the design factors and operating principles of the guided delivery vehicle according to the presently disclosed systems, methods, and/or apparatuses are explained with reference to various exemplary embodiments of a guided delivery vehicle according to the presently disclosed systems, methods, and/or apparatuses. The basic explanation of the design factors and operating principles of the guided delivery vehicle is applicable for the understanding, design, and operation of the guided delivery vehicle of the presently disclosed systems, methods, and/or apparatuses.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the exemplary embodiments and/or elements such terms describe. Thus, these terms are not necessarily intended to indicate temporal or other prioritization of such exemplary embodiments and/or elements.

The term "coupled", as used herein, is defined as connected, although not necessarily directly, and not necessarily mechanically. The terms "a" and "an" are defined as one or more unless stated otherwise.

Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises", "has", "includes" or "contains" one or more operations possesses those one or more operations but is not limited to possessing only those one or more operations.

It should also be appreciated that the terms "self-guided", "carrier", and "guided delivery vehicle" are used for basic explanation and understanding of the operation of the systems, methods, and apparatuses of the presently disclosed systems, methods, and/or apparatuses. Therefore, the terms "self-guided", "carrier", and "guided delivery vehicle" are not to be construed as limiting the systems, methods, and apparatuses of the presently disclosed systems, methods, and/or apparatuses.

For simplicity and clarification, the guided delivery vehicle of the presently disclosed systems, methods, and/or apparatuses will be described as being utilized in a restaurant for serving environment. However, it should be appreciated that these are merely exemplary embodiments of the guided delivery vehicle and are not to be construed as limiting the presently disclosed systems, methods, and/or apparatuses. Thus, the guided delivery vehicle of the presently disclosed systems, methods, and/or apparatuses may be adapted to many applications and utilized in any delivery environment. For example, by way of illustration and not limitation, the guided delivery vehicle may also be used in retail locations for delivery of food or non-food items, in retail stores to deliver products, or in store displays to display items for consumers.

Turning now to the drawing FIGS., FIGS. 1A-4 illustrate certain elements and/or aspects of an exemplary embodiment of the guided delivery vehicle 100, according to the presently disclosed systems, methods, and/or apparatuses. In illustrative, non-limiting embodiment(s) of the presently disclosed systems, methods, and/or apparatuses, as illustrated in FIGS. 1A-4, the guided delivery vehicle 100 comprises a carrier body 105, one or more wheels 102 and wheels 103, one or more optional item support regions 110, one or more selectable elements 120, one or more impact resistant elements or bumpers 130, at least one conductive surface 140, one or more obstacle detection sensors 150, at least one or more power storage elements 160, at least one or more servo motors 170, a controller 180, and a transceiver 190.

Figure 3:
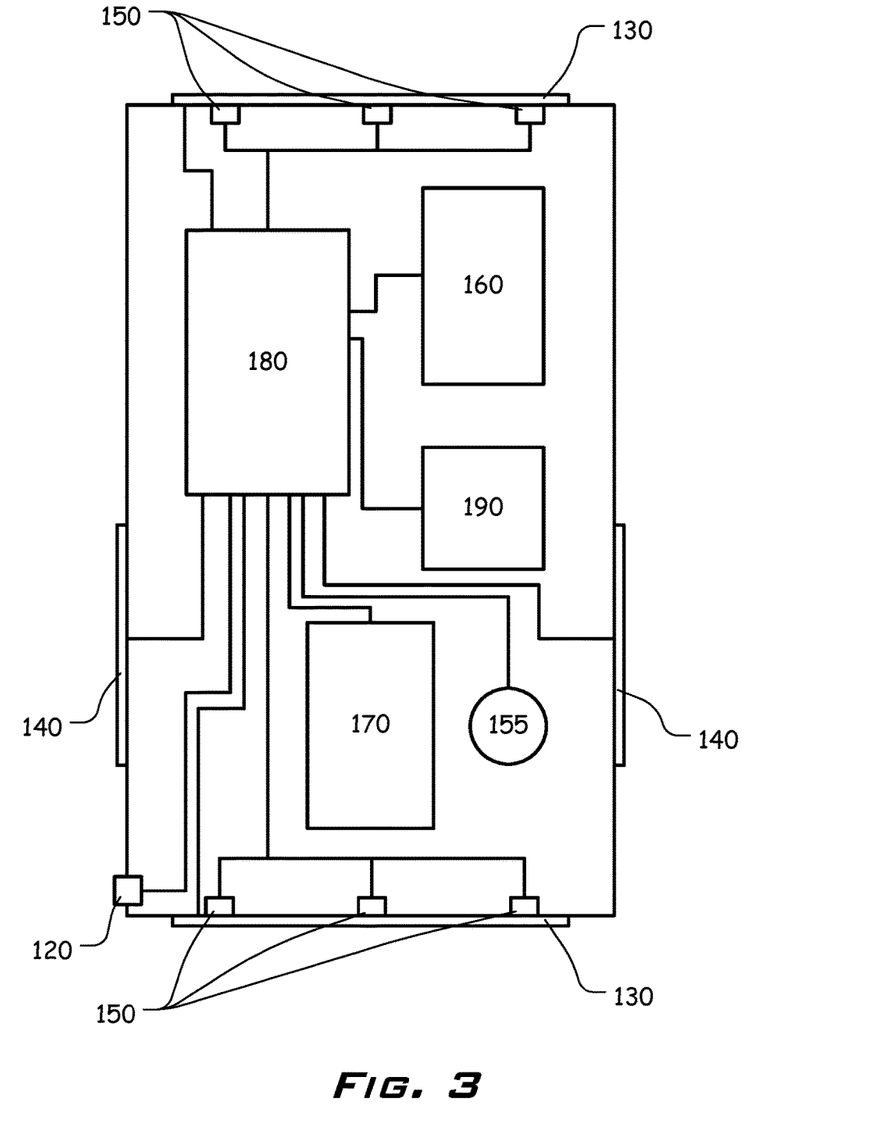
FIG. 3 is a block diagram illustrating certain exemplary components of an exemplary embodiment of the guided delivery vehicle, according to the presently disclosed systems, methods, and/or apparatuses.

At least certain of the components of the guided delivery vehicle 100 will are electrically connected to the controller 180 such that the controller 180 is able to receive input from at least some of the obstacle detection sensor 150, the bumpers 130, the transceiver 190, the one or more selectable elements 120, and the conductive surfaces 140. In response to receiving certain inputs, the controller 180 is able to actuate the server motor 170 to control one or more drive wheels, such as, for example, wheels 102 and/or wheels 103 to cause the guided delivery vehicle 100 to move forward, backward, in a circular or spinning fashion, or in a desired direction.

In various exemplary embodiments, the guided delivery vehicle 100 further comprises certain additional electrical, mechanical, electromechanical, automation, and other components that are housed within the carrier body 105. These and other of the components of the guided delivery vehicle 100 may be used, for example, to navigate, receive and process signals, optionally transmit signals, receive, process, and respond to the signals, and operate, control, and monitor the guided delivery vehicle 100.

It should also be understood that the overall size and shape of the guided delivery vehicle 100, and the various portions thereof, is a design choice based upon the desired functionality and/or appearance of the guided delivery vehicle 100.

Typically, the guided delivery vehicle 100 is powered by one or more power storage elements 160. In various exemplary, nonlimiting embodiments, the one or more power storage elements 160 comprises a replaceable or rechargeable battery. Other methods of powering the guided delivery vehicle 100 or charging or recharging the one or more power storage elements 160, such as, for example, solar panels, may be incorporated depending on application requirements and usage environment.

In certain exemplary, nonlimiting embodiments, the one or more power storage elements 160 is able to be recharged when one or more of the conductive surfaces 140 is in physical contact with an electrically conductive surface or other element.

The one or more servo motors 170 may comprise one or more servo or other motors mechanically or otherwise attached, coupled, or linked via a drivetrain, to the one or more wheels 102 and/or 103. It should be appreciated that one or more sets of wheels 102 and/or 103 may be used as drive wheels. Thus, all or only select wheels 102 and/or 103 may be used to drive and steer the self-contained carrier 100.

It should also be appreciated that a more detailed explanation of how the one or more wheels 102 and/or 103 are attached or coupled to the one or more servo motors 170 and certain other items and/or techniques necessary to implement locomotion and steering of the guided delivery vehicle 100 for the implementation and/or operation of the various exemplary embodiments of the presently disclosed systems, methods, and/or apparatuses are not provided herein because such background information will be known to one of ordinary skill in the art. Therefore, it is believed that the level of description provided herein is sufficient to enable one of ordinary skill in the art to understand, construct, and practice the systems, methods, and/or apparatuses, as described herein.

In certain embodiments of the guided delivery vehicle 100, the guided delivery vehicle 100 is able to operate in conjunction with and/or in response to commands from a mobile device or computer 200, wherein the mobile device or computer 200 is in contact with the guided delivery vehicle 100 via a Wi-Fi or other wireless or wired connection. In certain embodiments, the mobile device or computer 200 is able to communicate with the guided delivery vehicle 100 wirelessly, via Transmission Control Protocol/Internet Protocol (TCP/IP) connection.

In various exemplary, nonlimiting embodiments, data can be transmitted to, from, and/or between the guided delivery vehicle 100 and the mobile device or computer 200 via a Bluetooth wireless transmitter, such as, for example, Wireless Wi-Fi 802.11b/g/n. Depending on end user requirements, device configuration, and usage environment, other wireless communication methods can be employed (e.g., wireless Wi-Fi (IEEE 802.11), ZigBee (IEEE 802.15.4), Bluetooth (IEEE 102.15.1), Bluetooth Low Energy, ANT, and proprietary wireless standards at various frequencies). For example, in one exemplary embodiment a 2.4 GHz, Bluetooth V2.1 radio module is utilized, allowing communication directly to smart phones, computing devices, and tablets that support this Bluetooth protocol. These embodiments allow the guided delivery vehicle 100 to optionally communicate directly with devices with built-in wireless communication capabilities, in this example, via Bluetooth.

It should be understood that the mobile device or computer 200 may be a computer, a smart phone, a tablet, a personal digital assistant (PDA), a handheld organizer, or a similar or hybrid electronic device.

In various exemplary embodiments, the mobile device or computer 200 also includes a display and one or more input devices. In various exemplary embodiments, the display may be any other known or later developed system capable of displaying data. The one or more input devices may be one or more of a keyboard, a mouse, a touch screen, a touch pad, a stylus, a microphone, a camera, or any other known or later developed device capable of inputting data into the mobile device or computer 200.

The mobile device or computer 200 may also include memory to store data, a processor to convert data to text and/or symbolic graphics, and a screen to display the text and/or symbolic graphics. The mobile device or computer 200 may operate using an operating system such as, for example, and Android or iOS operating system.

If the one or more optional item support regions 110 are provided, each is typically, but not exclusively, positioned or formed atop the carrier body 105. Each item support region 110 comprises an area or portion of the carrier body 105 that is configured to support a load. The supportable load can vary from application to application and it should be appreciated that the number, size, and shape of each of the item support regions 110 is a design choice based upon the desired functionality and/or appearance of the guided delivery vehicle 100. As illustrated most clearly in FIGS. 1A, 1B, and 4, the item support regions 110 may comprise an area specifically sized and shaped so as to receive a desired item or load, such as, for example, a plate.

Figure 1A:
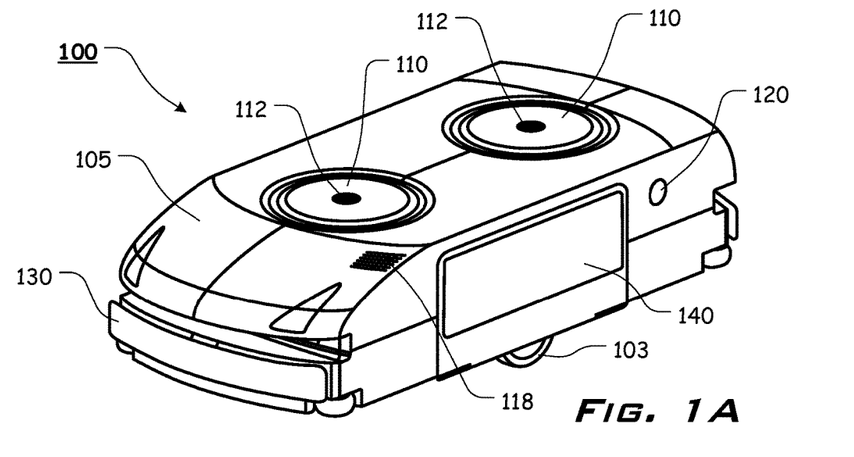
FIG. 1A illustrates a front perspective view of an exemplary embodiment of the guided delivery vehicle, according to the presently disclosed systems, methods, and/or apparatuses.
Figure 1B:
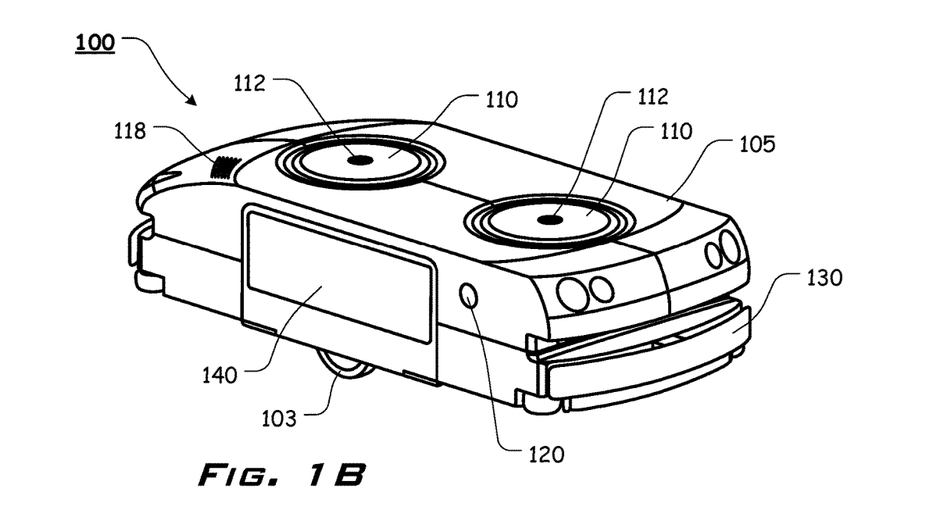
FIG. 1B illustrates a rear perspective view of an exemplary embodiment of the guided delivery vehicle, according to the presently disclosed systems, methods, and/or apparatuses.
Figure 2A:
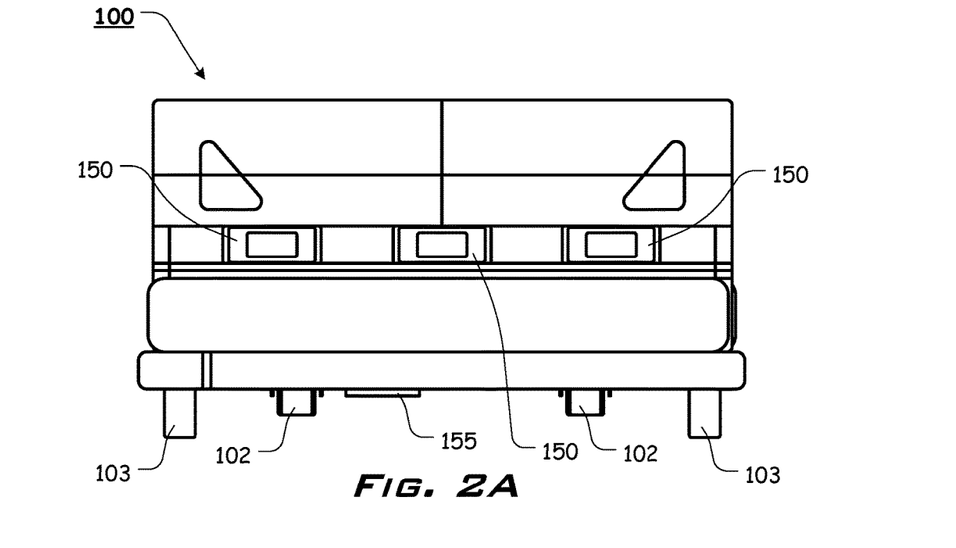
FIG. 2A illustrates a front view of an exemplary embodiment of the guided delivery vehicle, according to the presently disclosed systems, methods, and/or apparatuses.
Figure 2B:
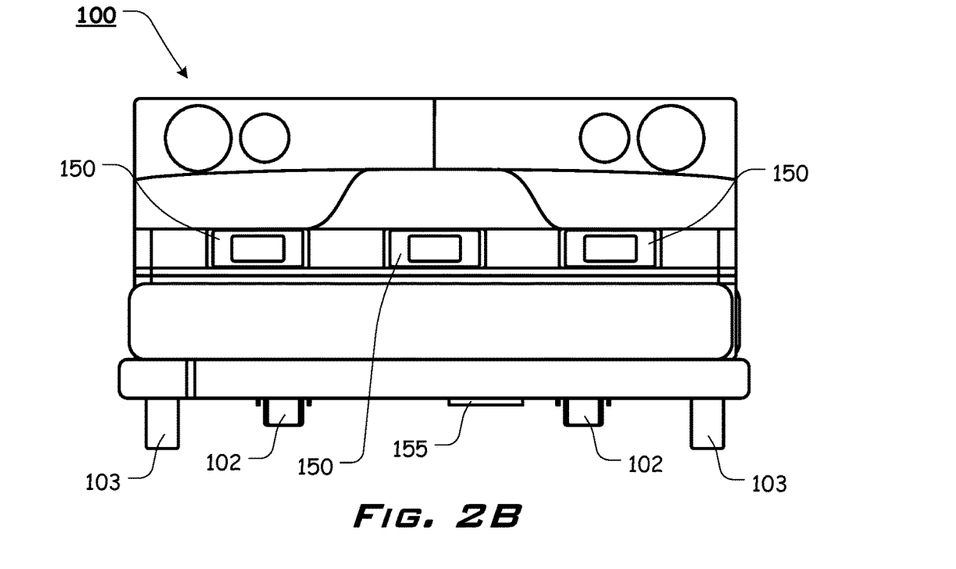
FIG. 2B illustrates a rear view of an exemplary embodiment of the guided delivery vehicle, according to the presently disclosed systems, methods, and/or apparatuses.
Figure 4:
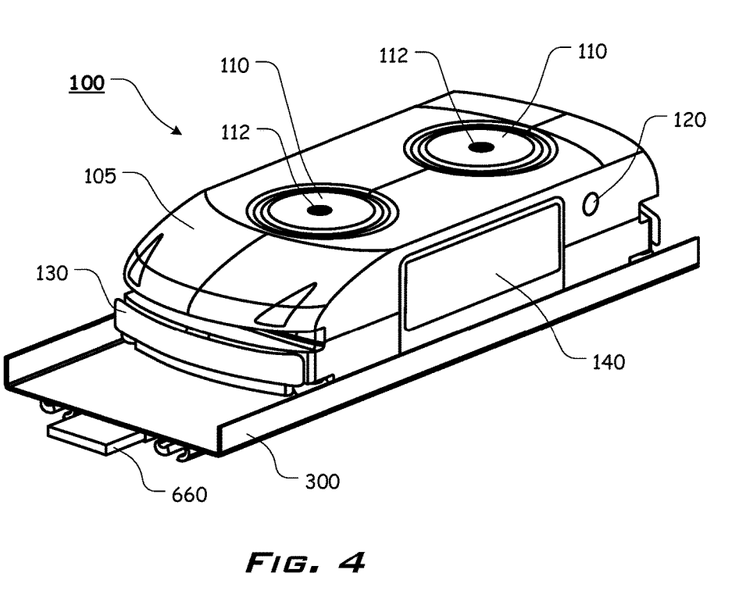
FIG. 4 illustrates an exemplary embodiment of the guided delivery vehicle on a guide track, wherein an exemplary junction identifier is provided under the guide track, according to the presently disclosed systems, methods, and/or apparatuses.

By way of example and not limitation, as illustrated in FIGS. 1A, 1B, and 4, the item support regions 110 may be sized and shaped so as to allow a serving dish or other plate to be placed atop each of the item support regions 110. When placed atop the item support region(s) 110, the plates would be capable of supporting or containing foodstuff or other items of consumables for eatery, which will then be sent to a specific patron or customer location using the guided delivery vehicle 100.

Once the guided delivery vehicle 100 reaches the customer, at a determined location (i.e., the customers table), the guided delivery vehicle 100 will stop its motion so that the customer can take his/her plate(s) with the order from the item support regions 110.

In certain exemplary embodiments, when the customer has taken his/her plate(s) from the item support regions 110 (or is otherwise finished with the use of the guided delivery vehicle 100), the customer may optionally be able to press or otherwise activate the one or more selectable elements 120. Once the one or more selectable elements 120 is activated, the guided delivery vehicle 100 may, for example, return to a determined location or continue to a desired location, such as, for example, a load retrieval point or a charging station 650, as per FIG. 8A.

The one or more selectable elements 120 may comprise one or more buttons, selectable switches, and/or a touch screen, a touch pad, or any other known or later developed device capable of inputting data into the guided delivery vehicle 100.

In certain other embodiments, the guided delivery vehicle 100 may comprise one or more load detection sensors 112 positioned so as to sense whether a load has been removed from one or more of the item support regions 110. In these embodiments, if it is determined that a load has been removed from one or more of the item support regions 110, the guided delivery vehicle 100 may automatically, either immediately or after a predetermined time interval, return to a determined location or continue to a desired location. Thus, it should be appreciated that the guided delivery vehicle 100 may return to a determined location or continue to a predetermined location based on input from a customer, a timed interval, a received input from the mobile device or computer 200, or in response to a load being removed from one or more of the item support regions 110.

The obstacle detection sensor 150 are generally placed proximate the front and back of the guided delivery vehicle 100. In the event that an obstacle or hindrance would be present or appear in the path of the guided delivery vehicle 100, while in motion, one or more of the obstacle detection sensor 150 detects the obstacle and the controller 180 controls the guided delivery vehicle 100 to stop before hitting the obstacle. In the event that the obstacle detection sensor 150 do not detect the obstacle (or did not detect the obstacle in time to achieve a stop of the guided delivery vehicle 100), the bumpers 130 serve as a secondary device to cause the guided delivery vehicle 100 to stop.

In certain exemplary embodiments, the bumpers 130 are in communication with bumper sensor(s) such that if the bumpers 130 hit the obstacle, contact between the bumpers 130 and the obstacle are detected by the bumper sensor(s) and the controller 180 controls the guided delivery vehicle 100 to stop further motion.

In certain embodiments, if the guided delivery vehicle 100 stops motion due to an obstacle in its way, the guided delivery vehicle 100 will emit a beeping or other sound, via a speaker or other output device 118, to send an audible alert that there is an obstacle that needs to be removed. After the obstacle or the hindrance is removed from the path of the guided delivery vehicle 100, the guided delivery vehicle 100 will resume performing its executed task 500.

In certain exemplary, non-limiting embodiments, one or more obstacle detection sensors 150 (optionally attached or coupled at or proximate front and back portions of the guided delivery vehicle 100) detect(s) an obstacle in the path of the guided delivery vehicle 100 and signals the guided delivery vehicle 100 to stop motion before hitting the obstacle.

In certain exemplary, non-limiting embodiments, the bumpers 130 may optionally be attached at or proximate front and back portions of the guided delivery vehicle 100. In these embodiments, if a bumper 130 contacts an obstacle (if, for example, the obstacle is not detected by the obstacle detection sensor 150), the one or more servo motors 170 of the guided delivery vehicle 100 is signaled, via the controller 180, to stop motion of the guided delivery vehicle 100. After the obstacle is removed from the route, the guided delivery vehicle 100 is then signaled to resume execution of its current task.

Figure 8A:
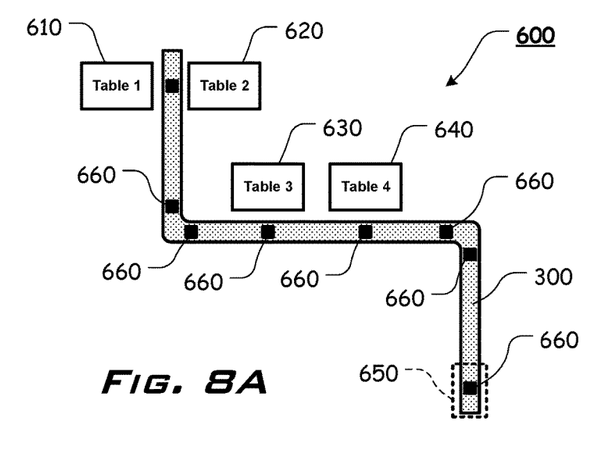
FIG. 8A illustrates shows an exemplary table delivery schematic, according to the presently disclosed systems, methods, and/or apparatuses.

As illustrated most clearly in FIG. 4, the guided delivery vehicle 100 is optionally capable of moving along a guide track, such as, for example, guide track 300. In various exemplary embodiments, the guide track 300 comprises sidewalls or un-walled track. The guide track 300 may comprise a single lane or multiple lanes and one or more guided delivery vehicles 100 may optionally operate simultaneously (either side by side or in tandem) on the guide track 300. The guide track 300 may extend from a discrete start point to a discrete endpoint (as illustrated in FIG. 8A) or may be in the form of a closed loop or circuit.

The guide track 300 includes one or more junction identifiers 660 positioned above, underneath (as illustrated), or within the guide track 300. In various exemplary embodiments, the junction identifiers 660 each comprise a magnetic strip. One or more junction detection sensors 155 of the guided delivery vehicle 100 is/are able to detect the presence or absence of the junction identifiers 660.

In certain exemplary embodiments, the junction identifiers 660 each comprise a magnetic, optical, or other sensible or recognizable indicia or element. Thus, it should be appreciated that at least one junction detection sensor 155 on the guided delivery vehicle 100 is capable of sensing or detecting each junction identifier 660. Then, in response to the sensed or detected junction identifier 660, advance along a set of commands.

In certain exemplary embodiments, the junction identifiers 660 are positioned at locations along the guide track 300 where the guided delivery vehicle 100 may optionally perform a specific task or command. Thus, during operation, the guided delivery vehicle 100 is able to perform steps in a command set by traveling along the guide track 300, sensing a discrete junction identifier 660 of the junction identifiers 660, and advancing through the command set steps to perform the next step in the command set in response to sensing the discrete junction identifier 660.

In certain exemplary, non-limiting embodiments, certain junction identifiers 660 determine the commands for the guided delivery vehicle 100, the guided delivery vehicle 100 sense the junction identifiers 660 via one or more junction detection sensors 155 of the guided delivery vehicle 100.

During operation, the guided delivery vehicle 100 can turn and move along the guide track 300 in any desired direction. If the guide track 300 is of an angle bend or a curve bend, the guided delivery vehicle 100 is capable of going through those bends and/or curves. In various exemplary embodiments, the guided delivery vehicle 100 is capable of rotating itself. Thus, movement of the guided delivery vehicle 100 is not limited to forward or reverse movement and the guided delivery vehicle 100 is able to turn and move in any track in the direction along the guide track 300.

Figure 5:
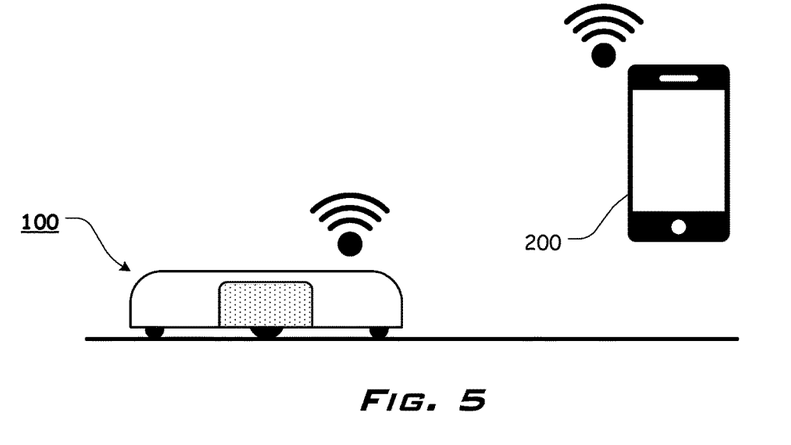
FIG. 5 illustrates an overview of an exemplary wireless communication system, utilizing an exemplary mobile device or computer, according to the presently disclosed systems, methods, and/or apparatuses.

FIGS. 5-9 illustrate certain exemplary communications methods and/or certain exemplary operational flow charts of certain exemplary embodiments of the guided delivery vehicle 100, according to the present disclosure. For example, FIG. 5 provides an illustration representing an overview of certain the wireless communication characteristics and/or capabilities of the guided delivery vehicle 100.

In certain illustrative, nonlimiting embodiments, the mobile device or computer 200 will host a Wi-Fi hotspot that allows connection to the guided delivery vehicle 100. After the guided delivery vehicle 100 is successfully connected to the mobile device or computer 200, the mobile device or computer 200 will communicate with the guided delivery vehicle 100 using, for example, a Transmission Control Protocol/Internet Protocol (TCI/IP) connection or any similar or later developed communication convention or protocol.

Figure 6:
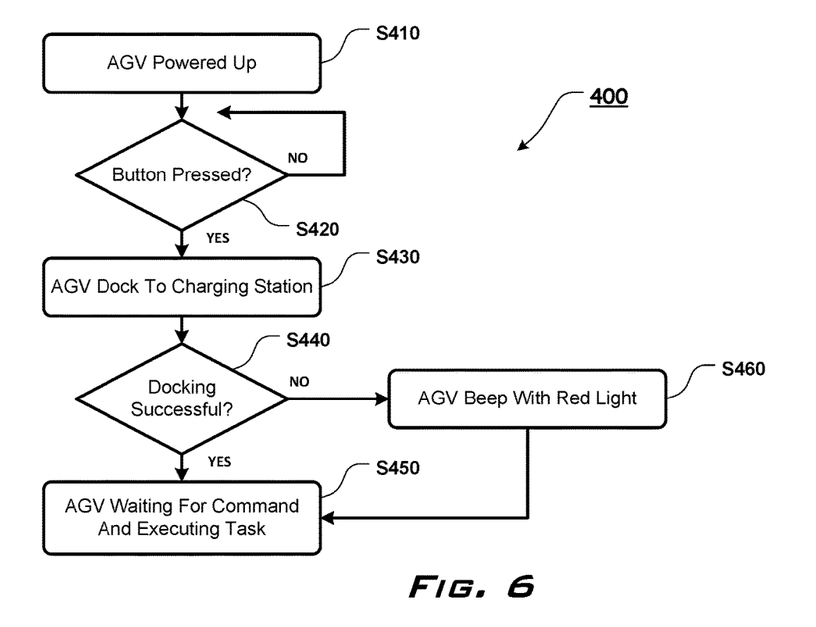
FIG. 6 illustrates an exemplary flowchart illustrating an optional guided delivery vehicle start-up operation flow, according to the presently disclosed systems, methods, and/or apparatuses.
Figure 7:
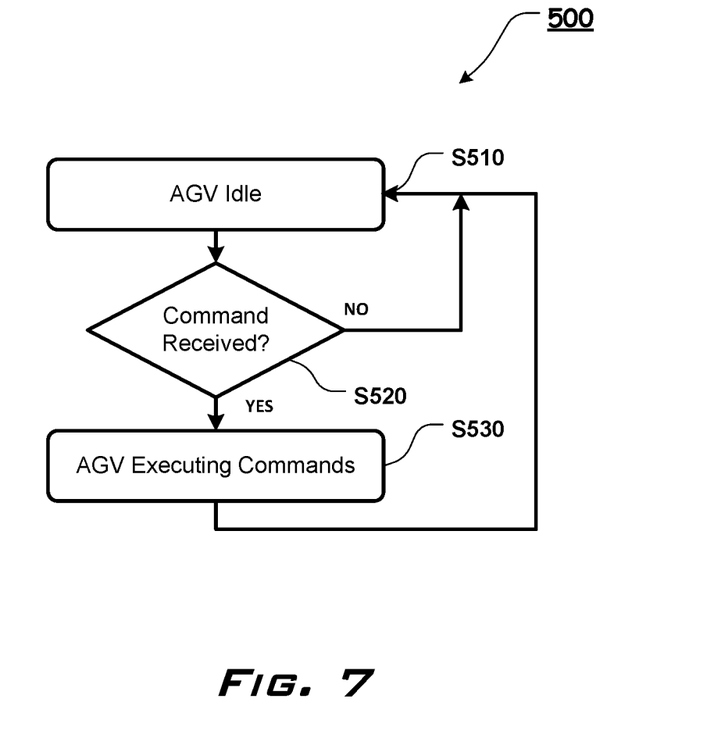
FIG. 7 illustrates an exemplary flowchart illustrating an optional guided delivery vehicle task execution flow, according to the presently disclosed systems, methods, and/or apparatuses.

FIGS. 6 and 7 show flowcharts outlining exemplary embodiments of methods for use and operation of the presently disclosed systems and/or methods. As shown in FIG. 6, the startup operation flow 400 begins in step S410 and the guided delivery vehicle 100 is powered up so that the guided delivery vehicle 100 can begin operation. Step S410 continues to step S420 and a determination is made as to whether a power button (or other button or element) has been pressed or actuated. In certain exemplary embodiments, the power button is positioned at a bottom of the carrier body 105. If, in step S420, it is determined that the power button has not been pressed or actuated, the method returns to step S420 to continue monitoring for a power button press or actuation.

If, in step S420, it is determined that the power button has been pressed or actuated, the method advances to step S430 and the guided delivery vehicle 100 is set to (or returns to) its docking position. In various exemplary embodiments, the docking position is at a charging station 650 where one or more of the conductive surfaces 140 can contact or otherwise interact with one or more corresponding conductive surfaces of a charging device to recharge the one or more power storage elements 160.

Once the guided delivery vehicle 100 is in its docking position, the method advances to step S440 and a determination is made as to whether the guided delivery vehicle 100 is successfully docked. If, in step S440, it is determined that docking was not successful, the method jumps to step S460 and the guided delivery vehicle 100 provides at least one of an audible and/or visual indication that docking was not successful. Even if it is determined, in step S440, that docking was not successful, the method still advances from step S460 to step S450, wherein the guided delivery vehicle 100 awaits a command and executing task.

Otherwise, if in step S440, it is determined that docking was successful, the method advances to step S450 and the guided delivery vehicle 100 awaits a command and executing task.

As shown in FIG. 7, the execute task 500 operation begins in step S510, wherein the guided delivery vehicle 100 is idle, awaiting a command and executing task. Step S510 continues to step S520 and a determination is made as to whether a command has been received. If, in step S520, it is determined that a command has not been received, the method returns to step S520 to continue monitoring for a received command.

If, in step S520, it is determined that a command has been received, the method advances to step S530 and the guided delivery vehicle 100 wakes from idle, confirms receipt of the received command(s), and executes the received command or commands.

Once the received command or commands have been executed, the method returns to step S510 and the method begins again.

In various exemplary, non-limiting embodiments, the guided delivery vehicle 100 comprises one or more selectable elements with one or more end users. Thus, if there is no response from the end user for a specific period of time, the guided delivery vehicle 100 will automatically return to a determined location, such as, for example, the charging station 650.

In certain exemplary, non-limiting embodiments, the guided delivery vehicle 100 is capable of propelling itself in a given direction in response to at least one drive control signal or command.

In certain exemplary, non-limiting embodiments, a discrete device (such as, for example, a computer or other device located at or proximate a customer's table) can be utilized to transmit a command to the guided delivery vehicle 100 to execute one or more tasks to be accomplished. Then, in response to receipt of the transmitted command, the guided delivery vehicle 100 executes the one or more tasks. Thus, for example, a customer can select an item using a computer or other device located at the customer's table. Then, in response to the customer selection the computer or other device transmits a command to the guided delivery vehicle 100 to execute one or more commands to deliver the selected item to the customer's table. Then, in response to receipt of the transmitted command, the guided delivery vehicle 100 executes the one or more commands to retrieve the selected item and deliver the selected item to the customer's table.

Figure 8B:
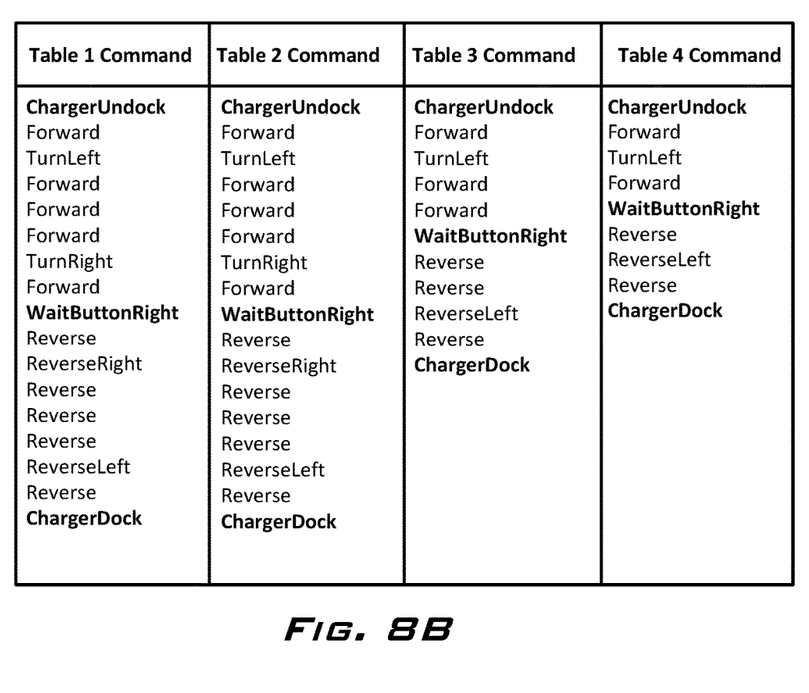
FIG. 8B shows a simplified example of exemplary guided delivery vehicle commands for allowing the guided delivery vehicle to execute a task based on a specific customer request at a specific table location, according to the presently disclosed systems, methods, and/or apparatuses.

FIG. 8A shows an exemplary table delivery schematic 600, while FIG. 8B shows a simplified example of exemplary commands for controlling the guided delivery vehicle 100 to execute a task based on a specific customer request at a specific table location. For example, if an order is placed by or for a customer at Table 1 610. In response to the order being placed, the mobile device or computer 200 establishes a communications connection, optionally via Wi-Fi, with the guided delivery vehicle 100 and communicates, for example, via TCI/IP as described in reference to FIG. 5.

The restaurant staff or another device will position the consumers order on a plate and place the plate on the item support regions 110. The restaurant staff then inputs, at the mobile device or computer 200, the Table 1 Command. In response to the inputted Table 1 Command, a command set is communicated to the guided delivery vehicle 100, which receives the command set, as illustrated in the table below for Table 1 Command. When the command set is received by the guided delivery vehicle 100, the guided delivery vehicle 100 executes the command set as a task 500.

To execute the command set, the guided delivery vehicle 100 begins by leaving the charging station 650 (the "ChargerUndock" command). The guided delivery vehicle 100 then executes the "Forward" command by moving forward along the along the guide track 300.

When the guided delivery vehicle 100 reaches the next junction identifier 660 it will detect and operate according to the next command, which is "TurnLeft". In response to the "TurnLeft" command, the guided delivery vehicle 100 will turn left and continue to move forward until the guided delivery vehicle 100 detects the next junction identifier 660. When the guided delivery vehicle 100 detects the next junction identifier 660, the guided delivery vehicle 100 will respond according to the next command in the Table 1 command set, which is "Forward". The guided delivery vehicle 100 will then execute the "Forward" command, by continuing to move forward until the guided delivery vehicle 100 detects the next junction identifier 660.

This process of detecting junction identifiers 660 and executing subsequent commands at each junction identifier 660, according to the command set will continue until the guided delivery vehicle 100 reaches the area of Table 1 610, as indicated by the junction identifier 660 proximate Table 1 610/Table 2 620.

Once the guided delivery vehicle 100 reaches the junction identifier 660 proximate Table 1 610/Table 2 620, the guided delivery vehicle 100 executes the "WaitButtonLeft" command and stops its motion for the customer to remove the plates that include his/her ordered items from the item support region(s) 110.

Once the customer is done removing the plates from the item support region(s) 110, the customer is able to press or otherwise activate the one or more selectable elements 120, optionally facing the customer. In response to activation of the one or more selectable elements 120 (or optionally after a predetermined amount of time has expired or a sensor indicates that the plate has been removed from the item support regions 110), the guided delivery vehicle 100 resumes executing task 500 by following the subsequent commands at each subsequent junction identifier 660 until the guided delivery vehicle 100 returns to the charging station 650.

It should be appreciated that similar command sets are followed to deliver items to other customers at other tables, as further illustrated in FIGS. 8A and 8B.

Figure 9:
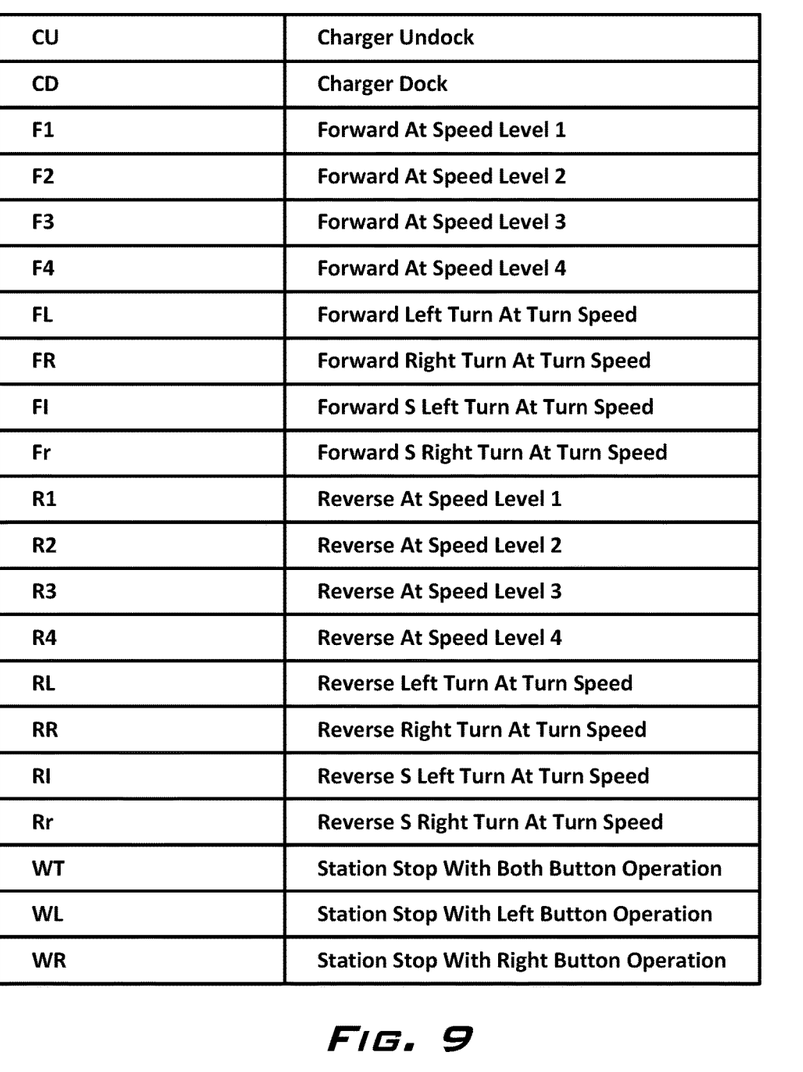
FIG. 9 illustrates an exemplary listing of certain optional guided delivery vehicle movement commands, according to the presently disclosed systems, methods, and/or apparatuses.

FIG. 9 illustrates an exemplary listing of certain optional guided delivery vehicle movement commands that can be utilized by the guided delivery vehicle 100. It should be appreciated that the listing of commands is illustrative and not limiting and that additional commands were command sets can be utilized by the guided delivery vehicle 100.

It should also be appreciated that a more detailed explanation of the components utilized in the guided delivery vehicle 100, instructions regarding how to use the mobile device or computer 200, methods for effecting communication between the guided delivery vehicle 100 and the mobile device or computer 200, and certain other items and/or techniques necessary for the implementation and/or operation of the various exemplary embodiments of the presently disclosed systems, methods, and/or apparatuses are not provided herein because such elements are commercially available and/or such background information will be known to one of ordinary skill in the art. Therefore, it is believed that the level of description provided herein is sufficient to enable one of ordinary skill in the art to understand and practice the systems, methods, and/or apparatuses, as described.

While the presently disclosed systems, methods, and/or apparatuses has been described in conjunction with the exemplary embodiments outlined above, the foregoing description of exemplary embodiments of the presently disclosed systems, methods, and/or apparatuses, as set forth above, are intended to be illustrative, not limiting and the fundamental disclosed systems, methods, and/or apparatuses should not be considered to be necessarily so constrained. It is evident that the presently disclosed systems, methods, and/or apparatuses is not limited to the particular variation set forth and many alternatives, adaptations modifications, and/or variations will be apparent to those skilled in the art.

It is to be understood that the phraseology of terminology employed herein is for the purpose of description and not of limitation. Unless defined otherwise, all technical and scientific terms used herein have the same meaning as commonly understood by one of ordinary skill in the art to which the presently disclosed systems, methods, and/or apparatuses belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the presently disclosed systems, methods, and/or apparatuses, such that others may, by applying current knowledge, change, vary, modify, and/or adapt these exemplary, non-limiting embodiments for various applications without departing from the spirit and scope of the presently disclosed systems, methods, and/or apparatuses and elements or methods similar or equivalent to those described herein can be used in practicing the presently disclosed systems, methods, and/or apparatuses. Any and all such changes, variations, modifications, and/or adaptations should and are intended to be comprehended within the meaning and range of equivalents of the disclosed exemplary embodiments and may be substituted without departing from the true spirit and scope of the presently disclosed systems, methods, and/or apparatuses.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A guided delivery vehicle, comprising:
   one or more item support regions atop a carrier body;
   one or more drive wheels attached or coupled to one or more powered servo motors;
   a receiver for receiving one or more transmitted signals;
   at least one junction detection sensor, wherein said at least one junction detection sensor is capable of detecting a discrete junction identifier associated with a determined position along a guide track, wherein said guided delivery vehicle is physically confined to said guide track; and
   a controller, wherein said controller receives and processes input from at least said receiver and said at least one junction detection sensor, and wherein said controller, in response to a received and processed input, executes at least one command step and continues to execute said at least one command step until detection of a subsequent, discrete junction identifier and sequentially executes one or more subsequent command steps upon detection of said at least one subsequent, discrete junction identifier, wherein at least certain of said command steps includes actuation of said one or more powered servo motors to control said one or more drive wheels to cause said guided delivery vehicle to move in a desired direction along said guide track.

2. The guided delivery vehicle of claim 1, further comprising a mobile device or computer that establishes a wireless connection to said guided delivery vehicle to transmit said one or more transmitted signals to said receiver of said guided delivery vehicle.

3. The guided delivery vehicle of claim 1, wherein said guided delivery vehicle is able to turn and move in any direction along said guide track.

4. The guided delivery vehicle of claim 1, wherein said guided delivery vehicle is physically confined to said guide track via one or more sidewalls of said guide track, and wherein said guided delivery vehicle is capable of maneuvering within said guide track.

5. The guided delivery vehicle of claim 1, further comprising one or more selectable elements, wherein said one or more selectable elements provide additional input to said controller and allow said guided delivery vehicle to receive commands or input from a user.

6. The guided delivery vehicle of claim 1, wherein each discrete junction identifier comprises at least one of a magnetic strip or an optically identifiable indicia or element.

7. The guided delivery vehicle of claim 1, wherein said one or more transmitted signals includes said command steps to execute said task.

8. The guided delivery vehicle of claim 1, wherein said controller contains one or more tables of command steps, and wherein said input identifies a discreet table of command steps from said one or more tables of command steps.

9. A method for controlling a guided delivery vehicle to execute a task, said guided delivery vehicle comprising:
   one or more item support regions atop a carrier body;
   one or more drive wheels attached or coupled to one or more powered servo motors;
   a receiver for receiving one or more transmitted signals;
   at least one junction detection sensor, wherein said at least one junction detection sensor is capable of detecting a junction identifier associated with a determined position along a guide track, wherein said guided delivery vehicle is physically confined to said guide track via one or more sidewalls of said guide track; and
   a controller, wherein said controller receives and processes input from at least said receiver and said at least one junction detection sensor, and wherein said controller is capable of actuating said one or more powered servo motors to rotate said one or more drive wheels to cause said guided delivery vehicle to move in a desired direction;

said method comprising:
   receiving, via said receiver, a transmitted signal;
   providing an input to said controller in response to receiving said transmitted signal;
   processing, via said controller, said input to determine one or more command steps to execute said task;
   performing a first command step until a junction identifier is detected by said at least one junction detection sensor; and
   performing a subsequent command step until a subsequent junction identifier is detected by said at least one junction detection sensor.

10. The method of claim 9, wherein said guided delivery vehicle further comprises a mobile device or computer that establishes a wireless connection to said guided delivery vehicle to transmit said one or more transmitted signals to said receiver of said guided delivery vehicle.

11. The method of claim 9, wherein said guided delivery vehicle is able to turn and move in any direction along said guide track.

12. The method of claim 9, wherein said guided delivery vehicle is capable of adjusting motion to maneuver along said guide track.

13. The method of claim 9, wherein said guided delivery vehicle further comprises one or more selectable elements, wherein said one or more selectable elements provide additional input to said controller and allow said guided delivery vehicle to receive commands or input from a user.

14. The method of claim 9, wherein each junction identifier comprises at least one of a magnetic strip or an optically identifiable indicia or element.

15. The method of claim 9, wherein said step of performing a subsequent command step until a subsequent junction identifier is detected by said at least one junction detection sensor comprises performing a subsequent command step at each of said subsequent junction identifiers along said guide track.

16. The method of claim 9, wherein said transmitted signal includes said command steps to execute said task.

17. The method of claim 9, wherein said controller contains one or more tables of command steps, and wherein said input identifies a discreet table of command steps from said one or more tables of command steps.

18. The method of claim 9, wherein at least certain of said command steps includes actuation of said one or more powered servo motors to rotate said one or more drive wheels to cause said guided delivery vehicle to move in a desired direction.

19. A method for controlling a guided delivery vehicle to deliver an item to a customer, said guided delivery vehicle comprising:
   one or more item support regions atop a carrier body;
   one or more drive wheels attached or coupled to one or more powered servo motors;
   a receiver for receiving one or more transmitted signals;
   at least one junction detection sensor, wherein said at least one junction detection sensor is capable of detecting a junction identifier associated with a determined position along a guide track, wherein said guided delivery vehicle is physically confined to said guide track via one or more sidewalls of said guide track; and a controller, wherein said controller receives and processes input from at least said receiver and said at least one junction detection sensor;

said method comprising:

receiving, via said receiver, a transmitted signal, wherein said transmitted signal identifies a location proximate said customer for delivery of said item;

providing an input to said controller in response to receiving said transmitted signal;

processing, via said controller, said input to determine one or more command steps to retrieve said item and deliver said item to said location proximate said customer;

controlling said guided delivery vehicle to travel along a portion of said guide track until a junction identifier is detected by said at least one junction detection sensor;

determining whether said junction identifier identifies a location proximate said location of said customer; and continuing to perform, if said junction identifier does not identify a present location as said location proximate said location of said customer, a subsequent command step until a subsequent junction identifier is detected by said at least one junction detection sensor, and if said junction identifier identifies a present location as said location proximate said location of said consumer, allowing said consumer to remove said item from said guided delivery vehicle.

20. The method of claim 19, further comprising a mobile device or computer that establishes a wireless connection to said guided delivery vehicle to transmit said one or more transmitted signals to said receiver of said guided delivery vehicle.

* * * * *